Sept. 22, 1970 G. KINDEL 3,530,495
UNIVERSAL JOINT CONSTRUCTION
Filed Oct. 25, 1968
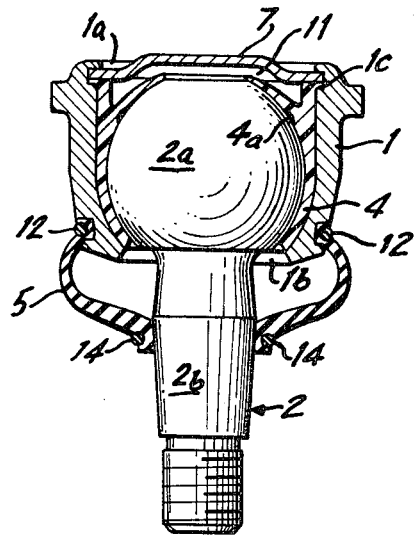
FIG.1
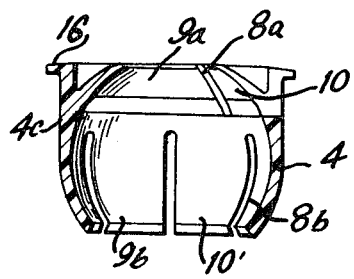
FIG.2
FIG.4  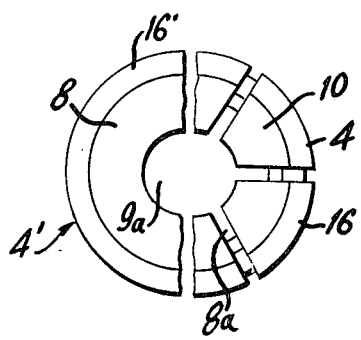  FIG.3
INVENTOR.
GEORG KINDEL
BY
*Mc Glew & Toren*
ATTORNEYS

# United States Patent Office 3,530,495
Patented Sept. 22, 1970

3,530,495
UNIVERSAL JOINT CONSTRUCTION
Georg Kindel, Hannover, Germany, assignor to Lemforder Metallwaren AG, Lemforde, Hannover, Germany
Filed Oct. 25, 1968, Ser. No. 770,549
Claims priority, application Germany, Oct. 27, 1967, 1,625,572
Int. Cl. F16c 11/06
U.S. Cl. 287—87                                    1 Claim

ABSTRACT OF THE DISCLOSURE

A ball and socket universal joint includes an outer housing which is opened at each end and a hinge pin having a ball portion which is rotatably supported in the housing on a one-piece spherical spring plate or bearing bush. The hinge pin includes a pin portion extending outwardly from the ball head through one end of the housing and the opposite end of the housing is closed by a cover which bears against an upwardly flanged extension of the spring plate within an annular groove formed on the interior bore of the housing directly adjacent this end. The spring plate is generally spherical and has an outer circumference of the housing so that the plate is under some prestressing. The plate extends substantially from one opening of the housing to the other and bears against the ball head surface of the hinge pin. The plate is made of a hard elastic material and is provided with a plurality of slots which extend inwardly from each end and divide each end into a plurality of segments which permit the plate to be sprung into position within the housing.

SUMMARY OF THE INVENTION

This invention relates, in general, to the construction of universal joints and, in particular, to a new and useful universal joint having a housing which is open at each end and which carries a bearing bush of generally spherical configuration for rotatably supporting the ball head of a hinge pin having a pin portion which extends outwardly from one end.

The present invention relates, in particular, to universal joint suspensions for motor vehicles particularly for the suspension of vehicle wheels where a ball pivot member or hing pin is supported within a bearing bush for pivotal movement in all directions. It has been known to provide constructions of such joints which include means for compensating for changes in the bearing clearance between the bearing bush and the ball head of the hinge pin which is caused by wear. Such compensation is usually provided by special compression springs or by using bearing bushes of rubber elastic material which provide for a readjustment of the sliding joint parts up to the limits of the elasticity of the material. A disadvantage in the known structures, however, is that they are made up of many parts and of complicated joint design and they are subject to permanent deformation of the rubber elastic bearing bushings so that poor running properties are obtained after relatively short periods of use. These disadvantages have been eliminated to a certain extent by using bearing bushes of abrasion-resistant materials having good sliding properties. With such materials, however, it is still required that additional means be employed to achieve readjustment forces and for such purposes elastic rings or other spring elements have been employed which makes the construction more complicated and expensive.

In accordance with the present invention, there is provided a ball and socket joint of extremely simple design having only a few parts but which provides optimum running properties and permits the use of materials providing high abrasion-resistance of the sliding parts and a long operating life with automatic readjustment of the joint. In accordance with the invention, this is provided by the use of a single resilient bushing element or bearing bush which is advantageously made of a hard plastic material. The element is of a single part spherical ring-shape with an outer circumference that increases in respect to the circumference of the surrounding housing in which it is positioned. The bearing bush is provided with a plurality of slots which extend circumferentially and advantageously from each opened end portion to facilitate the installation and loading of the device within the cavity defined by the surrounding housing. The bushing extends circumferentially around the ball head member from an end of the housing which is closed by a cover member to the opposite opened end through which the pin portion of the hinge pin extends. The cover member bears against a flange on an extension of the bearing bush and includes a peripheral portion which extends into an annular groove defined adjacent the opened end of the housing and which also accommodates the flange of the bearing bush.

Accordingly, it is an object of the invention to provide an improved universal joint having a single piece resilient bearing bushing having an exterior circumference which increases in respect to the interior surface of the housing which supports it and being provided with a plurality of grooves extending inwardly from each end which permit it to be prestressed within the housing, the bearing bush being spaced from the cover closing one end of the housing and being of a hard elastic material such as plastic.

A further object of the invention is to provide a bearing bush for pivotally supporting the ball head of a hinge pin of a universal joint which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 is a partial sectional and partial elevational view of a universal joint constructed in accordance with the invention;

FIG. 2 is a transverse sectional view of the bearing bush for the joint indicated in FIG. 1 in an unstressed state;

FIG. 3 is a top plan view of the bearing bush indicated in FIG. 2; and

FIG. 4 is a view similar to FIG. 3 of another embodiment of the invention.

DETAILED DESCRIPTION OF THE PREFERRED EMBODIMENTS

Referring to the drawings, in particular, the invention embodied therein in FIGS. 1 to 3 comprises a universal joint including a housing 1 having an opening at each end and a hinge pin generally designated 2 having a ball head portion 2a which is pivotally supported in the housing 1 for universal pivotal movement. The hinge pin 2 includes a pin portion 2b which extends outwardly through an open end 1b which is opposite to open end 1a of the housing 1. The open end 1a is closed by a cover 7 which engages at its periphery within an annular groove 1c of the housing 1. An annular elastic bellows or covering sleeve 5 is held at respective ends by a resilient ring member 12 within an annular groove on the exterior of the housing 1 and by a resilient ring 14 which surrounds the pin portion 2b of the hinge pin 2.

In accordance with the invention, there is provided a one-piece bearing bush or resilient bearing liner 4, which is preferably made of a hard elastic abrasion-resistant plastic having a smooth sliding surface 4a for pivotally supporting the ball head 2a. The bearing bush 4 is of generally ring-shaped configuration and it is advantageously divided at each end into upper and lower segments 10 and 10′, respectively, by slots 8a and 8b which extend inwardly from the respective ends. One end is provided with a relatively small-sized opening 9a and the opposite end is provided with a larger opening 9b through which the hinge portion 2b extends.

The bearing bush member 4 also includes an extension portion 4c which terminates in a flange 16 which is seated below the cover 7 in the annular groove 1c. The extension 4c is sprung outwardly as indicated in FIG. 2 until it is inserted within the housing 1.

In the embodiment indicated in FIG. 4, there is provided a bearing bushing 4′ having an opening 9a′ at the top end and an opening (not shown) at the bottom end similar to that indicated in embodiment of FIG. 2. In this embodiment, there are no slots corresponding to the slots 8a and 8b in the other embodiments.

In each embodiment, when the bearing bushing 4 or 4′ is positioned within the housing 1, there is a space 11 between the upper end thereof and the cover 7 and the cover does not load the bearing 4.

A bearing bushing 4 or 4′ constructed as outlined above, provides many advantages. The use of a single bearing bushing makes the assembly and construction of the universal joint very simple and inexpensive. The arrangement provides for improved running properties and a greater durability of the joint and insures a contact pressure against the ball head 2a at all times. A readjustment force necessary for equalizing the bearing play is achieved and, the necessary contact pressure is provided by the bearing bush because of its construction in which the exterior circumference increases in proportion to the diameter of the bore of the housing 1. The readjusting force which is provided by the bushing 4 may be determined specifically by the corresponding dimensions of the parts of the bearing bush and the housing in order to provide the desired spring loading.

What is claimed is:

1. A universal joint construction particularly for the suspension of wheels in a motor vehicle comprising, an outer housing defining a curved interior cavity with an opening at each end, a bearing bushing of one-piece construction of a hard elastic material supported within said housing and having an exterior circumference which increases in respect to the circumference of the interior wall of said housing in which it is located, a hinge pin having a ball head portion supported within said bearing bushing under the pre-stressing of said bushing by said housing for pivotal universal movement, a cover closing the end of said housing opposite to the end through which said hinge pin portion extends, the portion of said bearing bushing engaged around said head portion of said hinge pin being spaced from said cover but extending substantially to each end of said housing, said bearing bushing including a plurality of spaced slots extending in a circumferential direction inwardly from each end and dividing each end into a plurality of segments, said bearing bushing being loaded when positioned within said housing by the walls of said housing and having a segmented extension portion in engagement with the interior of said housing and pressed inwardly thereby and a segmented portion which curves and conforms to the surface of the ball head portion of said hinge pin at a location adjacent said cover, said extension portion including a flange, said housing having an annular groove receiving said flange and the periphery of said cover for holding said cover against the flange of said bearing bushing and in said housing.

References Cited

UNITED STATES PATENTS

| | | | |
|---|---|---|---|
| 2,999,708 | 9/1961 | Dudash | 287—87 |
| 3,063,744 | 11/1962 | Flumerfelt. | |
| 3,089,718 | 5/1963 | Gottschald et al. | |
| 3,149,863 | 9/1964 | Melton et al. | |
| 3,257,133 | 6/1966 | Wight | 287—87 |
| 3,375,028 | 3/1968 | Patton. | |
| 3,411,815 | 11/1968 | Sullivan. | |

FOREIGN PATENTS

| | | |
|---|---|---|
| 1,012,644 | 4/1952 | France. |
| 188,525 | 3/1964 | Sweden. |

DAVID J. WILLIAMOWSKY, Primary Examiner

A. V. KUNDRAT, Assistant Examiner